United States Patent [19]

Albers et al.

[11] Patent Number: 5,801,115
[45] Date of Patent: Sep. 1, 1998

[54] CATALYST COMPOSITION AND METHODS FOR USING AND PREPARING SAME

[75] Inventors: Edwin W. Albers, Severna Park; Harry W. Burkhead, Jr., Baltimore; J. Gary McDaniel, Bel Air, all of Md.

[73] Assignee: Kataleuna GmbH, Leuna, Germany

[21] Appl. No.: 523,434

[22] Filed: Sep. 5, 1995

[51] Int. Cl.⁶ .................... B01J 23/06; B01J 29/06
[52] U.S. Cl. ............... 502/342; 502/64; 502/68; 502/343; 502/350
[58] Field of Search ............... 502/341, 342, 502/343, 350, 60, 62, 63, 68, 172, 64

[56] References Cited

U.S. PATENT DOCUMENTS

| | | | |
|---|---|---|---|
| 4,211,718 | 7/1980 | Finch et al. | 260/449 M |
| 4,238,317 | 12/1980 | Vasalos et al. | 208/120 |
| 4,372,842 | 2/1983 | Gardner | 208/254 M |
| 4,469,589 | 9/1984 | Yoo et al. | 208/120 |
| 4,472,267 | 9/1984 | Yoo et al. | 208/120 |
| 4,495,304 | 1/1985 | Yoo et al. | 502/66 |
| 4,636,371 | 1/1987 | Farha, Jr. | 423/244 |
| 4,749,671 | 6/1988 | Saito et al. | 502/64 |
| 4,895,816 | 1/1990 | Gardner et al. | 502/10 |
| 5,002,654 | 3/1991 | Chin | 208/121 |
| 5,254,516 | 10/1993 | Gupta et al. | 502/84 |
| 5,298,473 | 3/1994 | Pinnavaia et al. | 502/84 |
| 5,403,366 | 4/1995 | Leininger et al. | 48/197 R |

OTHER PUBLICATIONS

Alak A. Bhattacharyya et al., "Catalytic $SO_x$ Abatement: The Role of Magnesium Aluminate Spinel in the Removal of $SO_x$ from Fluid Catalytic Cracking (FCC) Flue Gas", Ind. Eng. Chem. Res., vol. 27, No. 8, 1988, Feb. 29.

*Primary Examiner*—Michael Lewis
*Assistant Examiner*—Alexander G. Ghyka
*Attorney, Agent, or Firm*—McDermott, Will & Emery

[57] ABSTRACT

A catalyst composition for a catalyst that reduces the emissions of sulfur compounds from industrial processes is disclosed. This catalyst is a spheroidal particle comprised of a mixture of inorganic oxides with an inorganic binder, an organic binder, or a mixture of these binders. The preferred embodiment is a particle containing zinc titanate. Also disclosed is the catalysts application in both fluid bed and ebullating bed processes such as petroleum refinery fluid catalytic cracking units and utility company coal gasification units. Additionally there is disclosed processes for preparing this catalyst using spray drying techniques and beading and tumbling techniques.

11 Claims, No Drawings

CATALYST COMPOSITION AND METHODS FOR USING AND PREPARING SAME

BACKGROUND OF THE INVENTION

1. Field of the Invention

This invention relates to fluidizable catalysts, methods for using the catalysts to reduce the emissions of sulfur compounds from industrial processes, and methods for preparing such catalysts. Specifically, this invention relates to the composition of a fluid catalyst for removing sulfur oxides ("$SO_x$") from emissions, methods for using this fluid catalyst to remove sulfur oxides from emissions, and methods for preparing this fluid catalyst.

2. Description of the Background Art

The processing or burning of any sulfur containing fossil fuel can result in the emission of sulfur-containing compounds, such as $H_2S$ and $SO_x$, to the atmosphere. To comply with increasingly stringent environmental regulations, catalyst manufacturers and other researchers are continuously seeking catalysts, additives, and processes to reduce the emissions of sulfur compounds from industrial processes. Several methods of desulfurization are currently being used commercially. These methods include flue gas scrubbing as well as various fixed bed, ebullating bed, and fluid bed catalytic reaction processes. Some of these processes treat the flue gas just prior to the release of the gas to the atmosphere. Other processes are performed upstream of the emission release in order to prevent the undesired emission from occurring. The goal of any process is to reduce the emission of sulfur-containing compounds into the atmosphere.

Processes wherein sulfur-containing compounds are emitted often occur in a fluid bed or an ebullating bed. An example of a fluid bed process is a fluid cracking catalyst operation in a petroleum refinery wherein $SO_x$ emissions are generated in the fluid cracking catalyst regenerator and released in its flue gas. An example of an ebullating bed process is catalyst operation used by utility companies for coal gasification wherein $H_2S$ is generated and emitted from the flue gas or hot gas.

The fluid cracking catalyst process that is used in petroleum refining presents a particularly difficult challenge for emissions control because a catalyst must both "capture" the sulfur compounds as $SO_x$ under fluid cracking catalyst regenerator conditions and "release" this sulfur as $H_2S$ under fluid cracking catalyst stripper/reactor conditions. Few catalysts have been found that can accomplish this dual requirement effectively and/or economically without adversely effecting operation of the fluid cracking catalyst unit.

The industry is lacking a composition for a fluid catalyst for economically removing sulfur oxides ("$SO_x$") from emissions from a variety of industrial processes. Further, the industry lacks effective and economical methods for using a fluid catalyst to remove sulfur oxides from emissions, and methods for preparing such a fluid catalyst.

SUMMARY OF THE INVENTION

The invention includes a catalyst composition. The catalyst or catalyst composition consists essentially of at least one $SO_x$ capturing oxide and at least one inorganic binder.

The invention also includes a process for reducing the amount of $SO_x$ emissions passing through a fluid particle bed. This process comprises the step of introducing into the fluid particle bed a microspheroidal catalyst having a composition comprising at least one $SO_x$ capturing oxide and at least one inorganic binder. The next step is oxidizing on the microspheroidal catalyst $SO_x$ emissions of $SO_2$ to $SO_3$ in a fluid particle bed regenerator. The step of capturing the $SO_3$ in the fluid particle bed regenerator as an inorganic sulfate on the $SO_x$ capturing oxide follows. The step of reducing the inorganic sulfate to a sulfide in a fluid particle bed reactor/stripper follows. Then, releasing the sulfur as $H_2S$ upon hydrolysis in the stripper.

The invention also includes a process for preparing a catalyst for the removal of $SO_x$. This process comprises the step of blending at least one $SO_x$ capturing oxide and at least one inorganic binder in an aqueous solution. Drying the blend of $SO_x$ capturing oxide and inorganic binder follows in a spray dryer to form dried microspheroidal particles of about 90 microns to about 500 microns in diameter.

DETAILED DESCRIPTION OF THE INVENTION

The invention is a catalyst composition having at least one sulfur oxide ("$SO_x$") capturing oxide and a binder. The preferred $SO_x$ capturing oxide is a composition containing zinc titanate. The invention uses the catalyst composition in a process to reduce the emissions of sulfur compounds from industrial processes such as the fluid cracking catalyst ("FCC") process used in petroleum refineries and the coal gasification processes used by utility companies. The invention is also directed to processes for producing the fluidizable, spheroidal catalysts composition.

The catalyst composition is desirably formed into a fluidizable particle that is useful in both fluid bed and ebullating bed processes. An example of a fluid bed application is the use of the catalyst composition as a fluid cracking catalyst additive used in petroleum refineries to reduce $SO_x$ emissions from the fluid cracking catalyst regenerator flue gas. An example of an ebullating bed application is the use of the catalyst composition by a utility company to remove $H_2S$ from the flue gas or hot gas that is generated by the coal gasification process.

The $SO_x$ capturing oxide of the invention is desirably a mixed inorganic oxide additive for catalyzing the capture and release of sulfur-containing compounds in the fluid cracking catalyst provides refiners with an effective means for reducing fluid cracking catalyst $SO_x$ emissions. The invention is a catalyst composition for a formed spheroidal catalyst that reduces the emissions of sulfur containing compounds from industrial processes. For example, in the preferred embodiment of this catalyst, a mixed inorganic oxide particle containing zinc titanate, the zinc component "captures" and, thereby, removes the sulfur containing species, such as $H_2S$ or $SO_x$ that is present in the gas stream being treated.

The catalyst composition includes a combination of inorganic oxides with an inorganic binder, an organic binder, or a mixture of an inorganic and organic binder. Desirable inorganic oxides include a member selected from the group consisting of oxides or hydroxides of aluminum, calcium, cobalt, copper, iron, magnesium, molybdenum, silicon, titanium, vanadium, zinc, tungsten, strontium, nickel, manganese, zirconium, barium, members of the lanthanide series, and mixtures thereof. A desirable composition has zinc oxide and titanium dioxide in a molar ratio of about 0.8 to 1.5. The preferred zinc titanate catalyst composition also contains between two and five percent bentonite clay.

Many of the inorganic oxides for use with this invention are commercially available. For example, desirable zinc oxide powder for use with this invention has an average particle size of about 0.12 microns with a surface area of about 9 m²/g and is about 99.4 percent pure. Desirable titanium dioxide powder is in the rutile form and has an average particle size of about 0.5 microns with a surface area of about 12 m²/g and is about 94 percent pure.

The catalyst composition also includes a binder component to "glue" the inorganic oxides together into the formed spheroidal particles that are the catalyst. Depending on the application, different binding systems are used. For example, in more severe, high temperature applications such as fluid cracking catalyst, a hydrothermally stable inorganic binder such as aluminum chlorohydrol or peptized alumina is used. Effective inorganic binders include sols of aluminum such as aluminum chlorohydrol, peptized aluminas, sols of silica, colloidal silicas, sols of titanium, sols of zirconium, clays such as bentonite, calcined kaolinite, kaolinite, metakaolin, montmorillonite, chlorite, and talc, and mixtures of these. Desirable inorganic binders include at least one member selected from the group consisting of a sol of aluminum, peptized alumina, a sol of silica, colloidal silica, a sol of titanium, a sol of zirconium, a clay, and mixtures thereof. When the inorganic binder includes a clay, the clay is desirably a member selected from the group consisting of a smectite, calcined kaolinite, kaolinite, metakaolin, chlorite, talc, and mixtures of these. The smectite clays are especially desirable alone or in combination with another inorganic binder and a desirable smectite is a member selected from the group consisting of bentonite, montmorillonite, nontronite, hectorite, saponite, and mixtures of these. Desirable concentrations of inorganic binders are from about 2 to about 15 weight percent.

The preferred inorganic binder for the catalyst composition is a mixture. The mixture of inorganic binder has at least a first inorganic binder and a second inorganic binder. The first inorganic binder is a member selected from the group consisting of a sol of aluminum, peptized alumina, a sol of silica, colloidal silica, a sol of titanium, a sol of zirconium, a calcined kaolinite, kaolinite, metakaolin, chlorite, talc, and mixtures of these. The second inorganic binder is a smectite. The smectite is a member selected from the group consisting of bentonite, montmorillonite, nontronite, hectorite, saponite, and mixtures of these. The preferred concentration ratio of the first inorganic binder to the second inorganic binder is about two-thirds to about one-third.

In some applications such as a fluidized or ebullating bed found in many flue gas desulfurization units, an organic binder such as hydroxypropyl methyl cellulose or polyvinyl alcohol is used. Desirable organic binders include hydroxypropyl methyl cellulose, poly alcohols or mixtures of poly alcohols such as polyvinyl alcohol or polyethylene glycol, polyvinyl acetate, starch, molasses, lignin sulfonate, hydroxypropyl cellulose, and mixtures of these. Desirable concentrations of organic binders are from about 0.1 to about 10 weight percent.

Other components can be added to the catalyst composition to enhance the performance of the catalyst in specific applications or for a specific set of operating conditions. For example, in the fluid cracking catalyst application, the invented catalyst captures the $SO_3$ component of the regenerator gasses. The rate limiting step in the series of chemical reactions that include this $SO_3$ capture is the rate of formation of the $SO_3$ in the fluid cracking catalyst regenerator. An oxidation promoter such as platinum can be added to the catalyst composition to facilitate the oxidation of $SO_x$ to $SO_3$ in the fluid cracking catalyst regenerator thus improving the overall performance of the catalyst. Desirable additional components can include any number of activators, promoters, oxidizers, reducers, scavengers, and mixtures of these components. These material do not change the overall catalytic performance or functionality of the catalyst but merely enhance or optimize its performance.

Numerous surfactants can be used in the catalyst composition of this invention as well. A surfactant is initially selected for its stability in the component to which it is added. For example, the surfactant can be added to numerous "streams" that are used in the process of making this catalyst. A stream is often a slurry of a component used to form the desired particle. A stream can also be a dry component. If a stream, within which a surfactant is to be added, is acidic or alkaline, a surfactant must be chosen that is stable in the Ph of the selected stream. The surfactants are used primarily to enhance the manufacturing process when making the catalyst. Surfactants aid in the dispersion of the individual component particles that make up the catalyst and provide for particles that have superior density and hardness characteristics. Desirable surfactants include anionic fluorohydrocarbon materials. A suitable concentration of surfactant is desirably between about 0.25 and about four grams per five kilograms of dried product.

The catalyst composition preferably is in the form of a spheroidal particle of between about one and 10,000 microns in diameter. This spheroidal particle can be formed by spray drying or bead forming operations depending upon the diameter particle that is desired. Spheroidal particles are desirable because of their ability to become fluidized in fluidized or ebullating bed units. The preferred catalyst composition is dried into spheroidal particles in one of two conditions depending upon its intended use. The conditions include a first condition having an average particle size of between 60 and 80 microns for fluid cracking catalyst operations and a second condition having an average particle size of between 160 and 250 microns for fluid bed or ebulating bed operations. When the catalyst composition is dried into spheroidal particles having an average particle size of between 160 and 250 microns and the extreme particle range is desirably between 90 and 500 microns.

This invention is also the use of a catalyst composition to reduce the emissions of sulfur compounds from industrial processes. In a fluid cracking catalyst process, the catalyst composition is known as an fluid cracking catalyst "additive" and is added to the fluid cracking catalyst unit in the same manner as the cracking catalyst that is being used. The additive can be added separately or together in a mixture with the cracking catalyst. Usually the addition is accomplished by a pneumatic conveying system to blow the material directly into the fluid cracking catalyst generator. The catalyst additive then circulates through the fluid cracking catalyst unit in direct contact and along with the fluid cracking catalyst. The quantity of fluid cracking catalyst additive that is added and which then circulates in the unit must be sufficient to effectively reduce the emissions of sulfur containing compounds from the fluid cracking catalyst unit, yet it must not be present in a proportion so large that it substantially affects the operation of the cracking side of the process. Therefore, an fluid cracking catalyst additive level of between about 0.5 and about 10.0 percent of the circulating fluid cracking catalyst inventory is desirable.

The fluid cracking catalyst additive of this invention reduces the amount of $SO_x$ emissions from a fluid catalytic cracking unit by "capturing" the $SO_x$ in the fluid cracking catalyst regenerator section and "releasing" this captured sulfur as $H_2S$ in the stripper/reactor sections of the fluid cracking catalyst unit. The additive promotes the oxidation of $SO_x$ to $SO_3$ in the fluid cracking catalyst regenerator, captures this $SO_3$ in the fluid cracking catalyst regenerator by forming an inorganic sulfate, and reduces this inorganic sulfate in the fluid cracking catalyst stripper/reactor to $H_2S$. This $H_2S$ is later removed downstream. In the preferred embodiment of this invention, the zinc titanate component provides the functionality of $SO_X$ capture and $H_2S$ release.

In the coal gasification process, the flue gas or hot gas is passed through a fluidized or ebullating bed of catalyst to remove $H_2S$. The catalyst "captures" the $H_2S$ by forming an inorganic sulfide in the absorption stage of the process. This inorganic sulfide is then oxidized in the presence of oxygen in the regeneration stage of the process. The catalyst is restored to the original inorganic oxide and $SO_X$ is released which is later removed downstream.

The invention is also directed to processes for producing the catalyst. A first is a spray drying process to make smaller microspheroidal catalyst particles and a second is a beading or tumbling process to make larger spheroidal catalyst particles. As stated previously, the catalyst composition is in the form of a spheroidal particle of between about one and about 10,000 microns in diameter. The process that is selected to be followed depends, therefore, upon the diameter particle that is desired. In general, spheroidal particles are desirable because of their ability to become fluidized in fluidized or ebullating bed units.

The spray drying process begins with the acquisition and preparation of the raw materials. Commercial grades of the inorganic oxides desired are usually readily available. For example, in the preferred embodiment, zinc oxide and titanium dioxide are available from any number of sources. The inorganic oxide components are dry blended along with any other of the catalyst components that are acquired in dry form such as a clay material. The binder is prepared in a high shear mixer in an aqueous solution or slurry depending upon the binder selected. The mixture of dry blended ingredients is then slowly added to the binder solution to form a homogeneous aqueous slurry. The solids content of this slurry is then adjusted with water to make a suitable spray dryer feed of between about five to about 50 percent solids. The feed is then spray dried to form the microspheroidal catalyst particles. These particles can be further processed by calcination, washing, ion exchange, and/or drying if necessary or desired to improve the catalysts performance characteristics.

If larger spheroidal particles are desired, a beading or tumbling process is used. This process can be used to form particle sizes of about 100 microns to about 10,000 microns and larger. However, even though much larger sizes are possible, these sized beads are not of as much interest for fluid and ebullating bed applications.

First, the binder component is prepared in the form of a dilute aqueous solution. Any number of binders can be used. Next, the commercial grades of the inorganic oxide materials that are desired are dry blended along with any other components that are acquired in dry form, such as a clay material. The dry blend is put into a bead forming machine or tumbler of the kind used commercially to make beads such as a Nauta or Eirich mixer. The dry material is then tumbled while a fine spray of the binder solution is applied to the powder to form the spheroidal particles. Binder solution is applied and the material tumbled until the desired particle size is achieved. These particles can be further processed by calcination, washing, ion exchange, and/or drying if necessary or desired to improved the catalysts performance characteristics.

EXAMPLES

The following examples represent the catalyst composition as well as the processes of the invention.

EXAMPLE 1

This example represents the preferred embodiment of the invention by forming zinc titanate based particles suitable for use in an fluid cracking catalyst unit. The zinc titanate particles are formed from the inorganic oxide particles of zinc oxide and titanium dioxide.

First, the binder component is prepared. In this example, peptized alumina is being used to bind the catalyst. In a high shear mixer, a solution of 16 percent formic acid is added to a slurry solution of 16 percent pseudoboehmite alumina in water. A 50/50 blend of these two solutions is prepared in quantities sufficient to have 4.1 pounds of dry basis alumina in the blend.

Next, fine commercial grades of zinc oxide and titanium dioxide as described above are dry blended. They are blended to a ratio of one mole of zinc oxide to 1.5 moles of titanium dioxide. This example uses 13.1 pounds of zinc oxide and 8.7 pounds of titanium dioxide. An additional 1.2 pounds of bentonite clay is added to this blend.

The zinc oxide, titanium dioxide, and clay mixture is added slowly to the binder solution in the high shear mixer and is blended. The blending continues under high shear for at least five minutes or until the blend appears homogeneous. The solids level of this slurry blend is then adjusted with water to make a spray dryer feed of about 15 to 20 percent solids.

The blended material is fed to an APV spray dryer with a spinning wheel atomizer. The inlet temperature is about 340° C. and the outlet temperature is about 145° C. The spray dryer feed time is 29 minutes. Microspheroidal particles with an average particle size of 70 to 80 microns are formed.

The spray dried particles are then calcined. Calcining is performed at 830° C. for one and one-half hours.

EXAMPLE 2

This example produces zinc titanate particles by the process of the invention which are then blended with a combustion promoter.

An amount of nine pounds of the formed particles of example 1 are homogeneously blended with one pound of a commercial CO combustion promoter. The combustion promoter used in this example is alumina oxide impregnated with 500 parts per million of platinum.

EXAMPLE 3

This example produces zinc titanate particles by the process of the invention with a combustion promoter added directly to the formed particles.

Formed zinc titanate particles are produced according to example 1. Ten pounds of these particles are placed in a rotary chamber and sprayed with a stock solution of 20 percent chloroplatinic acid to impregnate the particles. The spraying is performed while the particles tumble in the rotary chamber until a sufficient quantity of chloroplatinic acid is applied to provide 50 parts per million of platinum to the formed particles. The particles are then dried to remove any excessive moisture.

EXAMPLE 4

This example is another embodiment of the invention wherein the zinc titanate particles that are produced are of a larger particle size suitable for use in a fluidized bed application such as hot gas desulfurization in a coal gasification unit.

As in example 1, first the binder component is prepared. The binder solution used in this example is a dilute solution of 1,410 grams of polyvinyl alcohol, 682 grams of polyethylene glycol, and 100 milliliters of Darvon #7 surfactant in 70 pounds of water.

Next, fine commercial grades of zinc oxide and titanium dioxide are dry blended. As before, they are blended to a ratio of one mole of zinc oxide to 1.5 moles of titanium dioxide. This example uses 15.3 pounds of zinc oxide and 10.2 pounds of titanium dioxide. An additional 1.7 pounds of bentonite clay and 3.5 pounds of kaolin clay are added to this blend.

The zinc oxide, titanium dioxide, and clay mixture is added slowly to the binder solution in the high shear mixer and is blended. The blending continues under high shear for at least five minutes or until the blend appears homogeneous. The solids level of this slurry blend is then adjusted with water to make a spray dryer feed of about 20 to 30 percent solids.

The blended material is fed to an APV spray dryer that has been adapted with a high pressure, single fluid nozzle. Spray dryer conditions are modified so that larger sized particles are produced. In this example, microspheroidal particles with an average particle size of 150 microns are formed.

The particles are then calcined according to example 1.

EXAMPLE 5

This example represents another type of process, a beading process, that can be used to form larger sized spheroidal particles of the catalyst. In this example particle sizes of 100 micron to 10,000 microns are produced; however, much larger sizes are possible, although these sized beads are not of as much interest for fluid and ebullating bed applications.

First, the binder component is prepared. In this example, a stock solution of 0.5 weight percent hydroxypropyl methyl cellulose is mixed. Also, five grams of Zonyl TBS surfactant solution are prepared such that one part of surfactant is diluted with 20 parts of deionized water. The surfactant solution is then added to the hydroxypropyl methyl cellulose solution.

Next, fine commercial grades of zinc oxide and titanium dioxide as described above are dry blended. They are blended to a ratio of one mole of zinc oxide to 1.5 moles of titanium dioxide. This example uses 13.1 pounds of zinc oxide and 8.7 pounds of titanium dioxide. An additional 1.2 pounds of bentonitic clay are added to this blend.

The dry zinc oxide, titanium dioxide, and clay mixture is put into a bead forming machine or tumbler of the kind used commercially to make beads such as a Nauta or Eirich mixer. In this example an LCI granulator is used. The dry material is then tumbled while a fine spray of the binder solution is applied to the powder to form the spheroidal particles. Binder solution is applied and the material tumbled until the desired particle size is achieved.

The particles are then calcined according to example 1.

We claim:

1. A fluid cracking catalyst composition comprising a sulfur-reducing additive containing:

an $SO_x$ capturing and releasing oxide comprising zinc titanate; and an inorganic binder comprising:

a first member selected from the group consisting of a sol of aluminum, peptized alumina, a sol of silica, colloidal silica, a sol of titanium, a sol of zirconium, metakaolin, chlorite, talc, and mixtures thereof; and a smectite selected from the group consisting of bentonite, montmorillonite, nontronite, hectorite, saponite, and mixtures thereof, wherein the concentration ratio of said first member to said smectite is about two-thirds to about one-third.

2. The catalyst composition of claim 1, further comprising an oxidation promoter.

3. The catalyst composition of claim 1, wherein said composition is dried into spheroidal particles in one of two conditions, said conditions being:

a first condition having an average particle size of between 60 and 80 microns; and a second condition having an average particle size of between 160 and 250 microns.

4. The catalyst composition of claim 3, wherein said composition is dried into spheroidal particles having an average particle size of between 160 and 250 microns and an extreme particle range of between 90 and 500 microns.

5. The catalyst composition of claim 1, wherein said composition is dried into spheroidal particles in one of two conditions, said conditions being:

a first condition having an average particle size of between 60 and 80 microns; and a second condition having an average particle size of between 160 and 250 microns.

6. The catalyst composition of claim 5 wherein said composition is dried into spheroidal particles having an average particle size of between 160 and 250 microns and an extreme particle range of between 90 and 500 microns.

7. The catalyst composition according to claim 2, wherein the oxidation promoter is a noble metal.

8. The catalyst composition according to claim 1, in the form of spheroidal particles.

9. The catalyst composition according to claim 8, in the form of microspheroidal particles having an average particle size between about 60 and about 80 microns.

10. The catalyst composition according to claim 8, further comprising a fluid cracking catalyst.

11. The catalyst composition according to claim 10, containing about 0.5 to about 10% of the sulfur-reducing additive.

* * * * *